United States Patent
Clark et al.

(10) Patent No.: US 6,333,378 B1
(45) Date of Patent: *Dec. 25, 2001

(54) ACRYLIC MODIFIED WATERBORNE ALKYD OR URALKYD DISPERSIONS

(75) Inventors: Mark D. Clark; Bradley J. Helmer; Glenn L. Shoaf, all of Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/321,610

(22) Filed: May 28, 1999

Related U.S. Application Data

(63) Continuation-in-part of application No. 09/133,485, filed on Aug. 12, 1998, now Pat. No. 6,242,528
(60) Provisional application No. 60/055,140, filed on Aug. 12, 1997.

(51) Int. Cl.[7] ...................................................... C08J 31/00
(52) U.S. Cl. .......................... 524/560; 524/561; 524/562
(58) Field of Search ................................... 524/560, 561, 524/562

(56) References Cited

U.S. PATENT DOCUMENTS

| | | | |
|---|---|---|---|
| 3,345,313 | 10/1967 | Ruhf et al. | 260/22 |
| 3,734,874 | 5/1973 | Kibler et al. | 260/29.2 |
| 3,778,395 | 12/1973 | Huelsman et al. | 260/22 |
| 3,894,978 | 7/1975 | Montesissa et al. | 260/23 |
| 3,979,346 | 9/1976 | Zuckert et al. | 260/23 |
| 4,011,388 | 3/1977 | Murphy et al. | 526/320 |
| 4,026,850 | 5/1977 | Frank et al. | 260/22 TN |
| 4,116,902 | 9/1978 | Harris et al. | 260/22 TN |
| 4,178,425 | 12/1979 | Emmons et al. | 528/73 |
| 4,180,645 | 12/1979 | Emmons et al. | 528/73 |
| 4,222,911 | 9/1980 | Christenson et al. | 266/22 TN |
| 4,293,471 | 10/1981 | Heiberger | 260/22 CB |
| 4,299,742 | 11/1981 | Belder et al. | 260/22 EP |
| 4,301,048 | 11/1981 | Hirayama et al. | 260/22 CQ |
| 4,333,864 | 6/1982 | Zückert | 525/501.5 |
| 4,413,073 | 11/1983 | Gibson et al. | 523/511 |
| 4,414,357 | 11/1983 | Wright et al. | 524/513 |
| 4,436,849 | 3/1984 | Aihara et al. | 523/501 |
| 4,451,596 | 5/1984 | Wilk et al. | 523/501 |
| 4,497,933 | 2/1985 | Gorzinski et al. | 524/604 |
| 4,504,609 | 3/1985 | Kuwajima et al. | 523/501 |
| 4,698,391 | 10/1987 | Yacobucci et al. | 525/162 |
| 4,737,551 | 4/1988 | Dervan et al. | 525/440 |
| 4,946,932 | 8/1990 | Jenkins | 528/272 |
| 5,011,883 | 4/1991 | Aksman | 524/513 |
| 5,102,925 | 4/1992 | Suzuki et al. | 523/500 |
| 5,296,530 | 3/1994 | Bors et al. | 524/558 |
| 5,349,026 | 9/1994 | Emmons et al. | 525/328.6 |
| 5,371,148 | 12/1994 | Taylor et al. | 525/293 |
| 5,378,757 | 1/1995 | Blount, Jr. et al. | 525/608 |
| 5,422,392 | 6/1995 | Floyd et al. | 524/457 |
| 5,484,849 | 1/1996 | Bors et al. | 525/167.5 |
| 5,494,975 | 2/1996 | Lavoie et al. | 525/928.6 |
| 5,525,662 | 6/1996 | Lavoie et al. | 524/558 |
| 5,530,059 | 6/1996 | Blount, Jr. et al. | 524/604 |
| 5,538,760 | 7/1996 | Sharma | 427/388.4 |
| 5,539,073 | 7/1996 | Taylor et al. | 526/323 |
| 5,559,192 | 9/1996 | Bors et al. | 525/300 |
| 5,569,715 | 10/1996 | Grandhee | 525/7 |
| 5,686,518 | 11/1997 | Fontenot et al. | 524/458 |
| 5,786,420 | 7/1998 | Grandhee | 525/7 |
| 5,869,590 | 2/1999 | Clark et al. | 526/323 |

FOREIGN PATENT DOCUMENTS

| | | |
|---|---|---|
| 0 457 276 | 11/1991 | (EP) . |
| 0 555 903 | 8/1993 | (EP) . |
| 92/01734 | 2/1992 | (WO) . |
| 95/02019 | 1/1995 | (WO) . |

OTHER PUBLICATIONS

Wang et al., "Emulsion and Miniemulsion Copolymerization of Acrylic Monomers in the Presence of Alkyd Resin," *Journal of Applied Polymer Science*, vol. 60, pp. 2069–2076 (1996).

Wicks et al., *Organic Coatings:Science and Technology*, vol. 1: Film Formation, Components, and Appearance, eds. John Wiley & Sonsw, Inc., pp. 200–201 (1992).

Solomon, *The Chemistry of Organic Film Formers*, eds. John Wiley & Sons, Inc., pp. 212–218 and p. 330 (1967).

*Primary Examiner*—Peter D. Mulcahy
(74) *Attorney, Agent, or Firm*—Bernard J. Graves

(57) ABSTRACT

A water-based latex of an acrylic-modified waterborne alkyd or uralkyd dispersion in water is described. The acrylic-modified waterborne alkyd or uralkyd is a hybrid resin prepared by the polymerization of at least one latent oxidatively-functional (LOF) acrylic monomer in the presence of a waterborne alkyd or uralkyd. Alternatively, the acrylic-modified waterborne alkyd or uralkyd is a hybrid resin prepared by shearing a mini-emulsion based on a solvent-borne alkyd or uralkyd dissolved in at least one LOF acrylic monomer. Preparation of the latexes may be achieved by emulsion polymerization of at least one latent oxidatively-functional acrylic monomer in the presence of a waterborne alkyd or uralkyd whereby the latent oxidative functionality of the acrylic polymer survives polymerization. Water-based latexes may also be prepared by polymerizing a sheared mini-emulsion based on a solvent-borne alkyd or uralkyd dissolved in at least one LOF acrylic monomer such that the latent oxidative functionality of the acrylic polymer survives polymerization. Such acrylic-modified waterborne alkyd or uralkyds are useful in a variety of coating compositions.

25 Claims, No Drawings

ACRYLIC MODIFIED WATERBORNE ALKYD OR URALKYD DISPERSIONS

This is a continuation-in-part of application Ser. No. 09/133,485 filed on Aug. 12, 1998 now U.S. Pat. No. 6,242,528, which claims benefit under 35 U.S.C. §119(e) of U.S. Provisional Application No. 60/055,140 filed Aug. 12, 1997, both of which are herein incorporated by reference in their entirety.

BACKGROUND OF THE INVENTION

1. Field of the Invention

The invention relates to a water-based latex of an acrylic modified waterborne alkyd or uralkyd dispersion in water. The invention also relates to a water-based latex based on non-waterborne or solvent-borne alkyds or uralkyds. Such hybrid resins are useful in a variety of coating compositions.

2. Description of Related Art

In recent years, considerable effort has been expended by the coatings industry to develop low or zero VOC containing coating formulations. Regulations to limit the amount of VOC content of industrial coatings have encouraged research and development to explore new technologies directed at reducing solvent emissions from industrial solvent-based coatings operations such as automotive, appliance, general metal, furniture, and the like. One technology involves the replacement of organic solvents with water and is of particular interest for the obvious reasons of availability, cost, and environmental acceptability. However, while the move from organic solvent-based compositions to aqueous compositions brings health and safety benefits, aqueous coating compositions must meet or exceed the performance standards expected from solvent-based compositions. The need to meet or exceed such performance standards places a premium on the characteristics and properties of waterborne polymer dispersions used in aqueous coating compositions.

Waterborne polymer dispersions have been prepared from each of the three primary industrial film-forming polymer types: polyesters, acrylics, and alkyds. Of the three polymer types, waterborne alkyd resins exhibit significantly higher storage stability and coating stability than the waterborne polyester or acrylic resins. In addition, waterborne alkyd resins, due to their low molecular weight, exhibit exceptional film forming ability which translates into very high gloss in the final coating film. Resistance properties are developed, as with traditional solvent-borne alkyds, via autooxidative crosslinking of the alkyd film. However, while waterborne alkyd polymers have shown, and continue to show promise, they have relatively slow "dry" and/or cure times, particularly at ambient temperatures. In an attempt to address such concerns, hybrids of waterborne alkyds and relatively high molecular weight acrylic polymers have received considerable attention and have demonstrated, in some cases, slight advantages over waterborne alkyd systems alone.

U.S. Pat. No. 4,413,073 describes the preparation of an aqueous dispersion of particles of a film-forming polymer comprising a pre-formed polymer and at least one polymer formed in situ ("multi-polymer particles"). The dispersion is prepared in the presence of an amphipathic stabilizing compound having a hydrophobic-lipophilic balance (HLB) of at least 8 and whose lipophilic portion comprises at least one ethylenic unsaturation. The aqueous dispersion is useful as a film-forming component of coating compositions.

U.S. Pat. No. 4,451,596 describes water-dilutable alkyd and acrylate resins for use in water-dilutable lacquer systems. A method for the preparation of water-dilutable resin preparations based upon alkyd and acrylate resins is also described.

European Patent 0 555 903 describes a water-dispersible hybrid polymer of an unsaturated fatty acid-functionalized polyester. In addition, aqueous dispersions of such a hybrid polymer for use in aqueous coating compositions with a high solids content and films produced by using such coating compositions are described.

WO 95/02019 describes an emulsion of an air-drying resin dispersed in water and the preparation of such emulsions. Hybrid emulsions of an alkyd resin and an acrylate resin are also described.

U.S. Pat. No. 5,538,760 describes a general process for cleaning and providing a protective shine to a hard surface by use of an alkyd/acrylic latex. The alkyd/acrylic latex is prepared from an aqueous emulsion of an alkyd resin and at least one monoethylenically unsaturated monomer. Upon heating of the aqueous emulsion, an alkyd/acrylic latex is formed which can then be applied to a hard surface.

The acrylic polymers of previous hybrids are either non-reactive or possess reactive groups (e.g. hydroxyl groups) which react, as do similar groups present in the alkyd resin, at elevated temperatures with aminoplasts such as melamine formaldehyde resins and only at elevated temperatures.

Uralkyd resins have also been used in various coating compositions. U.S. Pat. Nos. 4,178,425 and 4,180,645 describe uralkyd containing coating compositions having high solids content. More specifically, U.S. Pat. Nos. 4,178,425 and 4,180,645 each describe autooxidizable coating compositions based on (1) a member of the group consisting of an organic polyisocyanate, an isocyanate-modified drying oil or a urethane oil, and a uralkyd; (2) at least one non-volatile reactive liquid monomer selected from the group consisting of dicyclopentenyloxyalkyl acrylate and dicyclopentenyloxyalkyl methacrylate; and (3) an effective amount of a polyvalent metal-containing complex or salt that catalyzes the curing of (1) and (2).

U.S. Pat. No. 4,222,911 describes a coating composition containing a polyester diol extended uralkyd resin. The polyester diol extended uralkyd resin is prepared by reacting an oil modified alkyd resin, a polyester diol having a number average molecular weight in the range of from about 800 to about 4000, and a diisocyanate.

U.S. Pat. No. 3,778,395 describes a printing ink containing a color body and an oxidation vehicle. The oxidation vehicle is based on a modified uralkyd consisting of the reaction product of an alkyd prepolymer and a polyisocyanate.

U.S. Pat. No. 5,422,392 describes an aqueous ambient dry paint coating based on an addition copolymer matrix polymer of a polyurethane or polyester oligomer and an ethylenic monomer. The coating is free of organic coalescing solvents.

RU 2017780 describes a protective coating composition containing a uralkyd resin modified with an N,N'-substituted aliphatic amine, a drying agent, a cyclohexanone oxime and an organic solvent. SU 924184 describes the use of water soluble mixtures based on phenol formaldehyde and alkyd, alkyd-epoxide or uralkyd resins in electrophoretically produced polymer coatings.

SU 537099 describes rapidly drying uralkyd resins. Such uralkyd resins are prepared by reacting a modified oligoester with an isocyanate in the presence of an aliphatic alcohol and a N,N'-disubstituted aliphatic amine. SU 537104 describes the use of a uralkyd resin as an undercoating in aerosol form. The uralkyd resin is based on the reaction product of toluene diisocyanate with an ethriphthalic oligoester modified with dehydrated castor oil.

Various coating compositions have been prepared from polymer emulsion dispersions. U.S. Pat. No. 4,011,388 describes a process for preparing an aqueous polymer emulsion by polymerizing an aqueous dispersion of at least one polymer (e.g. cellulosic compounds) and at least one monomer (e.g. acrylics, methacrylics, styrene) to form an emulsion of a substantially homogeneous blend of at least two polymers.

U.S. Pat. No. 5,686,518 describes an essentially stable monomer mini-emulsion which includes water, a surfactant, a monomer or mixture thereof, and at least one polymer which functions as a polymeric co-surfactant. The monomer mini-emulsion is characterized by small monomer droplet size. Such an mini-emulsion can be polymerized to a polymer latex.

U.S. Pat. No. 5,569,715 describes a process for forming a hydrophobically modified emulsion and a modified emulsion polymer. The emulsion polymer is formed by combining a hydrophobic polymeric compound and an α,β-ethylenically unsaturated monomer to form a mixture and then subjecting the mixture to high shear to form surfactant stabilized particles of the hydrophobic polymer and monomers. The α,β-ethylenically unsaturated groups of the particles can be co-polymerized to form a hydrophobically modified core polymer. Addition of at least one more monomer including at least one α,β-ethylenically unsaturated hydrophilic monomer followed by emulsion polymerization results in the formation of a hydrophobically modified emulsion polymer.

Non-water reducible, i.e. solvent-borne, alkyds or uralkyds have not received much attention due to the difficulty in incorporating them into a waterborne system. Accordingly, there still exists a need in the art for a method of imparting water-reducibility to solvent-borne alkyds or uralkyds.

SUMMARY OF THE INVENTION

One aspect of the invention is a water-based latex of an acrylic-modified alkyd or uralkyd resin. The acrylic-modified alkyd or uralkyd resin is a hybrid resin resulting from the polymerization of at least one latent oxidatively-functional (LOF) acrylic monomer in the presence of a waterborne alkyd or uralkyd such that the resulting hybrid resin has latent oxidative functionality. The acrylic-modified alkyd or uralkyd resin may also be a hybrid resin resulting from the polymerization of a sheared mini-emulsion of a solvent-borne alkyd or uralkyd and at least one latent oxidatively-functional (LOF) acrylic monomer such that the resulting hybrid resin has latent oxidative functionality. The invention also provides a method for preparing such water-based latexes by polymerizing a hybrid resin resulting from the polymerization of at least one LOF acrylic monomer in the presence of a waterborne alkyd or uralkyd such that the resulting hybrid polymer has latent oxidative functionality. The invention further provides a method of preparing water-based latexes by dissolving a solvent-borne alkyd or uralkyd in at least one LOF acrylic monomer, dispersing the resulting mixture in an aqueous medium to form a pre-emulsion, shearing the pre-emulsion to form a mini-emulsion, and then polymerizing the mini-emulsion such that the resulting hybrid polymer has latent oxidative functionality. The invention still further provides coating compositions containing the water-based latexes of the invention.

DETAILED DESCRIPTION OF THE INVENTION

The invention provides a water-based latex of an acrylic-modified alkyd or uralkyd resin or hybrid resin. In one embodiment, the latex affords a stable, emulsion of a hybrid resin resulting from the polymerization of at least one latent oxidatively-functional (LOF) acrylic monomer in the presence of a waterborne alkyd or uralkyd such that the acrylic monomer retains a sufficient amount of LOF groups for further reaction with other LOF groups or alkyd or uralkyd functionality after or upon film formation. In another embodiment, a latex of the invention is based on an acrylic-modified waterborne alkyd or uralkyd resin of the invention which may also be prepared from solvent-borne alkyds or uralkyds.

Latexes of the invention are stable when stored at temperatures at or moderately above room temperature. The latex of the invention is capable of affecting crosslinking upon film formation. Such latex films or coatings may be cured at ambient temperature, thermally or photochemically.

In the water-based latexes of the invention, the hybrid resins generally exists as particles dispersed in water. The particles are generally spherical in shape. The particles may be structured or unstructured. Structured particles include, but are not limited to, core/shell particles and gradient particles. The core/shell polymer particles may also be prepared in a multilobe form, a peanut shell, an acorn form, or a raspberry form. It is further preferred in such particles that the core portion contains about 20 to about 80 wt % of the total weight of the particle and the shell portion contains about 80 to about 20 wt % of the total weight of the particle.

The average particle size of the hybrid latex may range from about 25 to about 500 nm. Preferred particle sizes range from about 50 to about 300 nm, more preferably from about 100 to 250 nm. The hybrid latex particles generally have a spherical shape.

The glass transition temperature ($T_g$) of the acrylic portion of the hybrid resin in accordance with the invention, may be up to about 100° C. In a preferred embodiment of the invention, where film formation of the latex at ambient temperatures is desirable, that glass transition temperature may preferably be under about 70° C., and most preferably between about 0–60° C., more preferably 30–60° C.

Hybrid resins derived from waterborne alkyds or uralkyds may be prepared by polymerization of at least one latent oxidatively-functional (LOF) acrylic monomer in the presence of a waterborne alkyd or uralkyd such that sufficient latent oxidative functionality of the acrylic monomer survives the polymerization process. Any polymerization process known in the art may be used. The polymerization may take place as a single stage or multi-stage feed. If a multi-stage feed is used, one or more stages may contain an LOF acrylic monomer and one or more stages may contain the alkyd or uralkyd resin. Different LOF monomers and/or alkyd or uralkyd resins may be used in different stages. Copolymers may be used as the acrylic portion of the modified alkyd or uralkyd and may be prepared by copolymerizing other ethylenically unsaturated monomers with the LOF acrylic monomer.

Preferably an emulsion polymerization process is used to prepare hybrid resins of waterborne alkyds or uralkyds.

Emulsion polymerization allows the preparation of high molecular weight polymers at low viscosity. The resulting hybrid resins containing latent oxidative functionality are one possible solution for a coating composition which crosslinks under a variety of cure conditions, e.g. ambient, thermal, and photochemical.

Preferably a mini-emulsion polymerization process is used to prepare a hybrid resin based on a solvent-borne alkyd or uralkyd. Under mini-emulsion conditions, a solvent-borne alkyd or uralkyd is dissolved in at least one latent oxidatively-functional (LOF) acrylic monomer, which may be added as a single- or multi-stage feed, to form a mixture which is then dispersed in an aqueous medium to form a pre-emulsion, each as described below. The pre-emulsion is then sheared to form a mini-emulsion. The mini-emulsion may then be polymerized, as described above, such that sufficient latent oxidative functionality of the acrylic monomer survives the polymerization process. The mini-emulsion, as described above, may also be polymerized as described in U.S. Pat. No. 5,686,518 and Wang et al., "Emulsion and Miniemulsion Copolymerization of Acrylic Monomers in the Presence of Alkyd Resin," *Journal of Applied Polymer Science*, Vol. 60, pp. 2069–2076 (1996), each of which is incorporated in its entirety by reference.

Waterborne Alkyd or Uralkyd Resin

A waterborne alkyd or uralkyd resin for use in the water-based latex of the invention may be any waterborne alkyd or uralkyd resin known in the art. According to the invention, an alkyd or uralkyd resin may be, respectively, any alkyd or any urethane alkyd (i.e. uralkyd) resin as understood by those of skill in the art. A waterborne alkyd or uralkyd may include any water-dissipatible, water-dispersible, or water-reducible (i.e. able to get into water) alkyd or uralkyd resin with the proviso that the waterborne alkyd or uralkyd does not contain a pendant sulfonate group to impart water-dissipatibility, water-dispersibility, or water-reducibility. Waterborne alkyd or uralkyds useful in the invention are those, for example, having other groups to impart water-dissipatibility, water-dispersibility, or water-reducibility. Such groups include, but are not limited to, pendant carboxylic acid groups as well as salts or anhydrides thereof, pendant polyethylene glycol groups and other pendant hydrophilic groups. The waterborne alkyd may also be dissipated, dispersed, or reduced into water using co-surfactants as known in the art. Examples of such alkyd resins are described in U.S. Pat. Nos. 3,979,346, 3,894,978, 4,299,742, 4,301,048, and 4,497,933, all of which are incorporated herein by reference. Examples of uralkyd waterborne electrophoretic and anaphoretic coatings are described in *Lakokras. Mater. Ikh Primen.*, No. 3, pp. 16–18 (1985) and *Lakokras. Mater. Ikh Primen.*, No. 6, pp. 9–11 (1987).

Generally waterborne alkyd resins may be prepared by reacting a monobasic fatty acid, fatty ester or naturally occurring-partially saponified oil; a glycol or polyol; and a polycarboxylic acid.

The monobasic fatty acid, fatty ester, or naturally occurring-partially saponified oil is preferably selected from the formulae (I), (II), and (III):

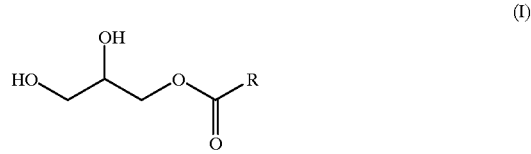

(I)

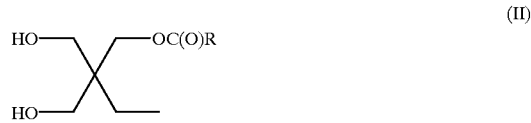

(II)

(III)

where the R group is a $C_8$–$C_{20}$ alkyl group. More preferably, the R group is one of the following:

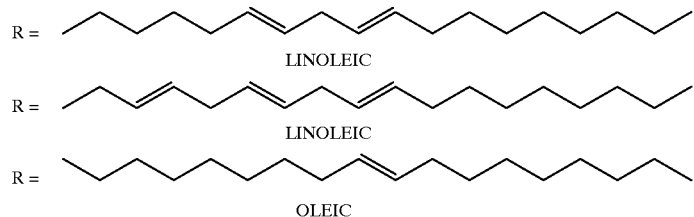

The monobasic fatty acid, fatty ester or naturally occurring-partially saponified oil is preferably prepared by reacting a fatty acid or oil with a polyol. Examples of suitable oils include, but are not limited to, sunflower oil, canola oil, dehydrated castor oil, coconut oil, corn oil, cottonseed oil, fish oil, linseed oil, oiticica oil, soya oil, tung oil, animal grease, castor oil, lard, palm kernel oil, peanut oil, perilla oil, safflower oil, tallow oil, walnut oil, and the like. Suitable examples of fatty acids alone or as components of oil include, but are not limited to, tallow acid, soya acid, myristic acid, linseed acid, crotonic acid, versatic acid, coconut acid, tall oil fatty acid, rosin acid, neodecanoic acid, neopentanoic acid, isostearic acid, 12-hydroxystearic acid, cottonseed acid, and the like.

The glycol or polyol is preferably selected from aliphatic, alicyclic, and aryl alkyl glycols. Suitable examples of glycols include, but are not limited to, ethylene glycol, propylene glycol, diethylene glycol, triethylene glycol, tetraethylene glycol, pentaethylene glycol, hexaethylene glycol, heptaethylene glycol, octaethylene glycol, nonaethylene glycol, decaethylene glycol, neopentyl glycol, glycerol, 1,3- propanediol, 2,4-dimethyl-2-ethyl-hexane-1,3-diol, 2,2-dimethyl-1,2-propanediol, 2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-tetramethyl-1,6-hexanediol, thiodiethanol, 1,2-cyclohexanedimethanol, 1,3-cyclohexanedimethanol, 1,4-cyclohexanedimethanol, 2,2,4-trimethyl-1,3-pentanediol, 2,2,4-tetramethyl-1,3-cyclobutanediol, p-xylenediol, hydroxypivalyl hydroxypivalate, 1,10-decanediol, hydrogenated bisphenol A, trimethylolpropane, trimethylolethane, pentaerythritol, erythritol, threitol, dipentaerythritol, sorbitol, mannitol, glycerine, trimellitic anhydride, pyromellitic dianhydride, dimethylolpropiconic acid, and the like.

The polycarboxylic acid is preferably selected from the group consisting of isophthalic acid, terephthalic acid, phthalic anhydride(acid), adipic acid, tetrachlorophthalic anhydride, tetrahydrophthalic anhydride, dodecanedioic acid, sebacic acid, azelaic acid, 1,4-cyclohexanedicarboxylic acid, 1,3-cyclohexanedicarboxylic acid, maleic anhydride(acid), fumaric acid, succinic anhydride(acid), 2,6-naphthalenedicarboxylic acid, glutaric acid and esters thereof.

In addition to the amount of polyol reacted with the fatty acid, fatty ester or naturally occurring-partially saponified oil according to the preferred step, an additional amount of a polyol or other branching agent such as a polycarboxylic acid may be used to increase the molecular weight and branching of the waterborne alkyd resin. These branching agents are preferably selected from trimethylolethane, pentaerythritol, erythritol, threitol, dipentaerythritol, sorbitol, glycerine, trimellitic anhydride, pyromellitic dianhydride, dimethylolpropionic acid, and trimethylolpropane.

Uralkyds, i.e oil-modified urethane resins, may be prepared in a similar manner to alkyds, as described above, except a diisocyanate (e.g. toluene diisocyanate) fully or partly replaces the polycarboxylic acid. The isocyanate can be an aliphatic or an aromatic isocyanate. Wicks et al., *Organic Coatings: Science and Technology,* Vol. I: Film Formation, Components, and Appearance, eds. John Wiley & Sons, Inc., pp. 200–201 (1992); Solomon, *The Chemistry of Organic Film Formers,* eds. John Wiley & Sons, Inc., pp. 212–218 and p. 330 (1967). Examples of suitable uralkyds can be found in U.S. Pat. Nos. 4,026,850, 4,116,902, 4,222,911, and 4,609,706, each of which is incorporated in its entirety by reference.

In order for the alkyd or uralkyd resin to serve as a reactive filming aid (via oxidative coupling) in a hybrid latex and become incorporated into the crosslinked polymer film, it is preferred that the alkyd or uralkyd have some finite oil length—long, medium or short. The finite oil length or oil content is generally between about 20 wt % and about 90 wt % in the alkyd or uralkyd composition based on the total weight of the alkyd or uralkyd resin. A "long" oil alkyd or uralkyd has an oil length or oil content of about 60–90 wt % based on the total weight of the alkyd or uralkyd resin. A "medium" oil alkyd or uralkyd has an oil content of about 40–60 wt % based on the total weight of the alkyd or uralkyd resin. A "short" oil alkyd or uralkyd has an oil length or oil content of about 20–40 wt % based on the total weight of the alkyd or uralkyd resin. "Long" to "medium" oil alkyds/uralkyds are preferred. Also in a preferred embodiment, an alkyd or uralkyd has an acid number of less than about 20, more preferably, less than about 15, and most preferably, less than about 5. The acid number may vary based on the properties desired in the resulting latex.

Solvent-borne Alkyd or Uralkyd Resin

A solvent-borne alkyd or uralkyd resin for use in the water-based latex of the invention may be any solvent-borne alkyd or uralkyd resin known in the art. Unlike waterborne alkyds or uralkyds, as described below, solvent-borne alkyds or uralkyds are those that are not water-dissipatible, water-dispersible, or water-reducible (i.e. able to get into water) unless one or more stabilizers (e.g. anionic and/or nonionic surfactant) are added along with some level of shear to disperse the alkyd or uralkyd and stabilizer into droplets. In general, according to the invention, solvent-borne alkyds or uralkyds will usually not consist of a salt (e.g. carboxylate, amine, sulfonate, or organic salt) nor will the level of pendant hydrophilic functionality (e.g. carboxyl, amine, sulfonate, polyethylene glycol or other) be high enough as to make the solvent-borne alkyd or uralkyd water-dissipatible, water-dispersible, or water-reducible without the addition of other stabilizing moieties. As with waterborne alkyds or uralkyds, a solvent-borne alkyd or uralkyd has some finite oil length (long, medium, short) and acid number as described above.

Latent Oxidatively-Functional (LOF) Acrylic Monomer

A latent oxidatively-functional (LOF) acrylic monomer used in the preparation of water-based latexes of the invention may be any acrylic monomer with at least one latent oxidatively-functional (LOF) group. The LOF group may be any pendant moiety which is capable of (i) surviving the polymerization process and (ii) participating in or promoting oxidative crosslinking of the modified alkyd or uralkyd. After polymerization of the LOF acrylic monomer, the hybrid resin possesses sufficient LOF groups to increase or amplify the degree of crosslinking normally found in alkyd or uralkyd resins. In other words, sufficient LOF groups remain to increase the effective crosslinking of the alkyd or uralkyd.

The presence of a LOF group on the hybrid resin makes crosslinking possible upon or after film formation. With a hybrid resin, crosslinking may occur between LOF groups of acrylic monomer(s), between a LOF group of an acrylic monomer and a ethylenically unsaturated functionality of the alkyd or uralkyd, or between ethylenically unsaturated functionalities of the alkyd or uralkyd. Capable of undergoing an oxidative reaction, the LOF group participates in or promotes oxidative crosslinking as a source of free radicals to generate a free-radical flux. Preferably the LOF group is an ethylenic unsaturation such as, but not limited to, allyl and vinyl groups. The LOF group may also preferably be an acetoacetyl moiety or enamine moiety. Preparation of enamines from acetoacetyl groups are described in U.S. Pat. Nos. 5,296,530, 5,494,975, and 5,525,662 which are incorporated here by reference.

Examples of acrylic monomers having latent oxidatively-functional (LOF) groups include, but are not limited to, allyl methacrylate, vinyl methacrylate, acetoacetoxyethyl methacrylate, hydroxybutenyl methacrylate, the allyl or diallyl ester of maleic acid, poly(allyl glycidyl ether) and the like.

The acrylic portion of the acrylic-modified alkyd or uralkyd may be a homopolymer or a copolymer. The LOF acrylic monomer may be added as a single type of monomer, as a mixture of LOF acrylic monomers, or as a mixture of a LOF acrylic monomer(s) and one or more ethylenically unsaturated co-monomers. Examples of suitable ethylenically unsaturated co-monomers include, but are not limited to, styrenic monomers such as styrene, α-methyl styrene, vinyl naphthalene, vinyl toluene, chloromethyl styrene and the like; ethylenically unsaturated species such as, for example, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, and the like; and nitrogen containing monomers including t-butylaminoethyl methaerylate, dimethylaminoethyl methacrylate, diethylaminoethyl methacrylate, N,N'-dimethylaminopropyl methacrylamide, 2-t-butylaminoethyl methacrylate, N,N'-dimethylaminoethyl acrylate, N-(2-methacryloyloxy-ethyl) ethylene urea, and methacrylamidoethylethylene urea. Preferably, the LOF acrylic monomer is added as a mixture of at least one LOF acrylic monomer and an ethylenically unsaturated co-monomer. More preferably, the ethylenically unsaturated co-monomer is a styrenic monomer.

Water-based Latexes

A water-based latex of the invention may be prepared by polymerizing at least one latent oxidatively-functional (LOF) acrylic monomer in the presence of an aqueous dispersion of a waterborne alkyd or uralkyd as described above. A water-based latex of the invention may also be prepared from solvent-borne alkyds or uralkyds, each as described above.

A water-based latex of the invention is stable at the same pHs as latexes prepared from traditional unmodified waterborne alkyd or uralkyds. However, unlike hybrid latexes of traditional unmodified waterborne alkyd or uralkyds, the waterborne alkyd or uralkyd based hybrid latexes of the invention are stable at pH≦7.

As described above, water-based latexes of the invention contain sufficient LOF groups to allow oxidative crosslinking of films formed from the water-based latex. Since the LOF group functions to increase the effective crosslinking of the alkyd or uralkyd, post-polymerization survival of sufficient LOF groups not only allows for their co-reactivity with other LOF groups and/or waterborne alkyd or uralkyd functionality upon or after film formation but may also promote similar oxidative crosslinking between alkyd or uralkyd functionalities. As a result of such co-reactivity between LOF groups and/or alkyd or uralkyd functionalities, better film properties are achieved.

As discussed above, the LOF acrylic monomer may be added either as a mixture of at least one LOF acrylic monomer or as a mixture of at least one LOF acrylic monomer and an ethylenically unsaturated co-monomer. If more than one LOF acrylic monomer is added, the monomer may be the same or different. Addition of the LOF acrylic monomer is conducted in a one-stage or multiple-stage (e.g. core-shell) process. Preferably, the LOF acrylic monomer is added in a one-stage process. By adding the LOF acrylic monomer or monomers in a one-stage process, a homogeneous acrylic polymer (i.e., simple terpolymer) is produced which contains a sufficient number of LOF groups (e.g. allyl, vinyl) capable of reacting with other LOF groups or alkyd or uralkyd functionality upon or after film formation or promoting reaction between functionalities on the alkyd or uralkyd. Addition of the LOF acrylic monomer in a multiple-stage process produces a heterogeneous acrylic polymer. For example, in a two-stage process, the first stage of the addition may produce a core polymer of preferably an acrylic or styrene/acrylic polymer which is often pre-crosslinked with a multi-functional monomer such as trimethylolpropane triacrylate. The second stage of the addition produces a shell polymer of preferably a styrene/acrylic polymer which contains a high level of LOF groups, such as reactive allyl and/or vinyl moieties. Monomers for use in such one- or multiple-stage polymerization processes are described in U.S. Pat. No. 5,539,073 incorporated herein by reference. The LOF groups may be located at the termini of a polymer as well as along the polymer backbone.

As discussed above, preferably the water-based latex of the invention based on waterborne alkyds or uralkyds is prepared under emulsion polymerization conditions. In general, upon emulsion polymerization of the LOF acrylic polymer compositions, it is primarily the ethylenic unsaturation moiety of the acrylic that undergoes polymerization and not the LOF group. If the LOF group participates in the polymerization, polymerization conditions are such that enough LOF groups survive in order to oxidatively crosslink with other LOF groups and/or hybrid resin functionality and/or to promote oxidative crosslinking between hybrid resin functionalities upon or after film formation. Survival of LOF groups, such as allyl or vinyl moieties, upon polymerization can be achieved by manipulating the differences in reactivity of the ethylenically unsaturated groups. For example, the ethylenically unsaturated acrylic moiety of an allyl or vinyl functionalized acrylic monomer has greater reactivity upon polymerization with styrenic monomers than the LOF allyl or vinyl moiety. As a result, the resulting polymer contains LOF groups. A description of manipulation of allyl functionalized acrylic polymer compositions to promote survival of the allyl moiety upon emulsion polymerization may be found in U.S. Pat. No. 5,539,073, which is incorporated herein by reference. Vinyl functionalized acrylic polymer compositions may be manipulated in a manner similar to that applied to allyl functionalized acrylic polymer compositions.

When the LOF group of the acrylic polymer is an acetoacetoxy moiety, under emulsion polymerization conditions it is the ethylenically unsaturated moiety which polymerizes. The acetoacetoxy moiety is uneffected by, and thus survives, the polymerization process.

Preferably a water-based latex based on solvent-borne alkyds or uralkyds is prepared under mini-emulsion polymerization conditions. Under such conditions, a solvent-borne alkyd or uralkyd is dissolved in at least one LOF acrylic monomer, each as described above. According to the invention, a solvent-borne alkyd or uralkyd is considered "dissolved" or soluble in at least one LOF acrylic monomer if after addition of the solvent-borne alkyd or uralkyd to at least one LOF acrylic monomer and then agitation, a clear to slightly turbid solution mixture forms with no apparent phase separation upon standing (i.e. the solution appears homogeneous). The resulting mixture is then dispersed in an aqueous medium to form a pre-emulsion. The aqueous medium may be any aqueous medium known in the art used in such polymerization conditions such as, for example, a water/surfactant solution. Examples of suitable surfactants include, but are not limited to, sodium dodecyl sulfate, TERGITOL 15S-40, AEROSOL OT-NV, and DOWFAX 2A1. The pre-emulsion is then sheared using a high-shear device to form a mini-emulsion. By shearing the emulsion to form small droplets prior to polymerization ensures that the predominant nucleation site and subsequent polymerization site occurs within the droplets. As a result, transport of the monomer from the droplets and precipitation of the solvent-borne alkyd or uralkyd is prevented. In essence, a previously solvent-borne system is now waterborne, as described above. Preferably, droplets of the mini-emulsion range in size from about 50 to about 500 nm. The mini-emulsion may then be polymerized, as with latexes based on waterborne alkyds or uralkyds, such that sufficient LOF groups remain to allow oxidative crosslinking of films as described above.

The polymerization process by which the hybrid latexes are made may also require an initiator, a reducing agent, or a catalyst. Suitable initiators include conventional initiators such as ammonium persulfate, ammonium carbonate, hydrogen peroxide, t-butylhydroperoxide, ammonium or alkali sulfate, di-benzoyl peroxide, lauryl peroxide, di-t-butylperoxide, 2,2'-azobisisobutyronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, ferrous sulfate heptahydrate, ferrous chloride, cupric sulfate, cupric chloride, cobalt acetate, cobaltous sulfate, and mixtures thereof.

Optionally, a conventional surfactant or a combination of surfactants may be used as a co-stabilizer or co-surfactant, such as an anionic or non-ionic emulsifier, in the suspension or emulsion polymerization preparation of a hybrid latex of the invention. Examples of preferred surfactants include, but are not limited to, alkali or ammonium alkylsulfate, alkylsulfonic acid, or fatty acid, oxyethylated alkylphenol, sulfosuccinates and derivatives, or any combination of anionic or non-ionic surfactant. A more preferred surfactant monomer is AEROSOL OT NV® (a surfactant commercially available from Cytec Industries, West Patterson, N.J.). A list of suitable surfactants is available in the treatise: McCutcheon's Emulsifiers & Detergents, North American Edition, MC Publishing Co., Glen Rock, N.J., 1997 which is incorporated herein by reference. Preferably a conventional surfactant or combination of surfactants is used when the alkyd or uralkyd portion of the hybrid resin represents up to about 35 wt %, generally about 5–20 wt % of the total solids of the latex. Preferably, the surfactant will provide droplet/particle stability, but result in minimal aqueous phase nucleation (micellar or homogeneous).

If the resulting hybrid latex is formulated with drier salts typically used in alkyd or uralkyd coatings and LOF moieties are present in the acrylic portion of the hybrid, significant improvements in, among other properties, latex gel fraction and swell ratio (LGF and LSR, respectively) are observed. While the alkyd or uralkyd portion of the hybrid latex of the invention plays an important role in both stabilizing the hybrid latex and improving film formation, it is the presence of the LOF acrylic portion of the hybrid that allows for better physical and mechanical film properties. The improved properties are related to greater crosslink density than that observed for hybrid resins containing non-LOF acrylics.

In general, the alkyd or uralkyd portion of the hybrid latex represents about 5–60 wt %, preferably about 10–50 wt %, more preferably about 20–40 wt % of the total solids of the latex while the acrylic portion of the hybrid latex represents about 30–90 wt %, preferably about 50–80 wt %, more preferably about 60–80 wt % of the total solids of the latex. Such hybrid latexes can be further used in coating compositions.

A coating composition of the invention contains a latex of a hybrid resin dispersion of the invention and may be prepared by techniques known in the art, e.g. as disclosed in U.S. Pat. Nos. 4,698,391, 4,737,551, and 3,345,313, each of which is incorporated herein by reference in their entirety. Examples of such coating compositions include, for example, architectural coatings, maintenance coatings, industrial coatings, automotive coatings, textile coatings, inks, adhesives, and coatings for paper, wood, and plastics. Coating compositions of the invention contain significantly less solvent, less than 25 wt % to as low as 1 wt % and even zero VOC content. The alkyd or uralkyd portion of the hybrid resin retains the desirable properties of an alkyd or uralkyd while the LOF acrylic portion of the resin compliments or enhances the oxidative crosslinking ability of the hybrid alkyd or uralkyd resin at ambient temperature. The coating compositions of the invention produce coatings that have high gloss, fast cure, and good acid and caustic resistance.

The coating composition may be coated onto a substrate and cured using techniques known in the art (e.g. by spray-applying 3 to 4 mils of wet coating onto a metal panel, and heating in a 150° C. forced air oven for 30 minutes). The substrate can be any common substrate such as paper, polyester films such as polyethylene and polypropylene, metals such as aluminum and steel, glass, urethane elastomers and primed (painted) substrates, and the like. The coating composition of the invention may be cured at room temperature (ambient cure), at elevated temperatures (thermal cure), or photochemically cured.

A coating composition of the invention may further contain coating additives. Examples of such coating additives include, but are not limited to, one or more leveling, rheology, and flow control agents such as silicones, fluorocarbons or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives and emulsion polymerization methodology may be found in U.S. Pat. No. 5,371,148, incorporated herein by reference.

Examples of flatting agents include, but are not limited to, synthetic silica, available from the Davison Chemical Division of W. R. Grace & Company under the SYLOID® tradename; polypropylene, available from Hercules Inc. under the HERCOFLAT® tradename; and synthetic silicate, available from J. M. Huber Corporation under the ZEOLEX® tradename.

Examples of dispersing agents and surfactants include, but are not limited to, sodium bis(tridecyl) sulfosuccinnate, di(2-ethylhexyl) sodium sulfosuccinnate, sodium dihexylsulfosuccinnate, sodium dicyclohexyl sulfosuccinnate, diamyl sodium sulfosuccinnate, sodium diisobutyl sulfosuccinnate, disodium iso-decyl sulfosuccinnate, disodium ethoxylated alcohol half ester of sulfosuccinnic acid, disodium alkyl amido polyethoxy sulfosuccinnate, tetra-sodium N-(1,2-dicarboxyethyl)-N-octadecyl sulfosuccinnamate, disodium N-octasulfosuccinnamate, sulfated ethoxylated nonylphenol, 2-amino-2-methyl-1-propanol, and the like.

Examples of viscosity, suspension, and flow control agents include, but are not limited to, polyaminoamide phosphate, high molecular weight carboxylic acid salts of polyamine amides, and alkylene amine salts of an unsaturated fatty acid, all available from BYK Chemie U.S.A. under the ANTI TERRA tradename. Further examples include polysiloxane copolymers, polyacrylate solution, cellulose esters, hydroxyethyl cellulose, hydrophobically-modified hydroxyethyl cellulose, hydroxypropyl cellulose, polyamide wax, polyolefin wax, carboxymethyl cellulose, ammonium polyacrylate, sodium polyacrylate, hydroxypropyl methyl cellulose, ethyl hydroxyethyl cellulose, polyethylene oxide, guar gum and the like. Other examples of thickeners include the methylene/ethylene oxide associative thickeners and water soluble carboxylated thickeners such as, for example, UCAR POLYPHOBE® by Union Carbide and ACRYSOL RM 825 available from Rohm and Haas of Philadelphia, Pa.

Several proprietary antifoaming agents are commercially available and include, for example, BUBREAK® of Buckman Laboratories Inc., BYK® of BYK Chemie, U.S.A., FOAMASTER® and NOPCO® of Henkel Corp./Coating Chemicals, DREWPLUS® of the Drew Industrial Division of Ashland Chemical Company, TRYSOL® and TROYKYD® of Troy Chemical Corporation, and SAG® of Union Carbide Corporation.

Examples of fungicides, mildewcides, and biocides include, but are not limited to, 4,4-dimethyloxazolidine, 3,4,4-trimethyloxazolidine, modified barium metaborate, potassium N-hydroxy-methyl-N-methyldithiocarbamate, 2-(thiocyano-methylthio)benzothiazole, potassium dimethyl dithiocarbamate, adamantane, N-(trichloromethylthio) phthalimide, 2,4,5,6-tetrachloro-isophthalonitrile, orthophenyl phenol, 2,4,5-trichlorophenol, dehydroacetic acid, copper naphthenate, copper octoate, organic arsenic, tributyl tin oxide, zinc naphthenate, and copper 8-quinolinate.

Examples of U.V. absorbers and U.V. light stabilizers include among others substituted benzophenone, substituted benzotriazoles, hindered amines, and hindered benzoates, available from American Cyanamid Company under the CYASORB UV tradename, and diethyl-3-acetyl-4-hydroxy-benzyl-phosphonate, 4-dodecyloxy-2-hydroxy benzophenone, and resorcinol monobenzoate.

Examples of solvents and coalescing agents are well known and include but are not limited to ethanol, n-propanol, isopropanol, n-butanol, sec-butanol, isobutanol, ethylene glycol monobutyl ether, propylene glycol n-butyl ether, propylene glycol methyl ether, propylene glycol monopropyl ether, dipropylene glycol methyl ether, diethylene glycol monobutyl ether, trimethylpentanediol monoisobutyrate, ethylene glycol mono-octyl ether, diacetone alcohol, TEXANOL® ester alcohol (Eastman Chemical Company), and the like. Such solvents and coalescing aids may also include reactive solvents and coalescing aids such as diallyl phthalate, SANTOLINK XI-100® polyglycidyl allyl ether from Monsanto, and others as described in U.S. Pat. Nos. 5,349,026 and 5,371,148, incorporated herein by reference.

Pigments suitable for use in the coating compositions envisioned by the invention are the typical organic and inorganic pigments, well-known to one of ordinary skill in the art of surface coatings, especially those set forth by the Colour Index, 3d Ed., 2d Rev., 1982, published by the Society of Dyers and Colourists in association with the American Association of Textile Chemists and Colorists. Examples include, but are not limited to, the following: titanium dioxide, barytes, clay, or calcium carbonate, CI Pigment White 6 (titanium dioxide); CI Pigment Red 101 (red iron oxide); CI Pigment Yellow 42; CI Pigment Blue 15, 15:1, 15:2, 15:3, 15:4 (copper phthalocyanines); CI Pigment Red 49:1; and CI Pigment Red 57:1. Colorants such as phthalocyanine blue, molybdate orange, carbon black or TIPURE R-746 (a titanium pure slurry available from Dupont Chemical, Inc. of Wilmington, Del.) are also suitable for the coating compositions of the invention.

The examples of various coating compositions of the invention use the following materials not described above:

AEROSOL OT-NV surfactant from Cytec Industries, West Patterson, N.J.

COBALT HYDROCURE II drier, sold by OMG, Cleveland, Ohio

DOWFAX 2A1 surfactant from Dow Chemical, Midland, Mich.

KELSOL 3960-B2G-75, 3922-G-80, 3964-B2G-70, and 3904-BG4-75 water reducible alkyds sold by Reichhold Chemical, Research Triangle Park, N.C.

TERGITOL 15-S-40 surfactant sold by Union Carbide Chemical and Plastics Co., Danbury, Conn.

TEXANOL ester-alcohol coalescent sold by Eastman Chemical Company, Kingsport, Tenn.

The following methods were used to evaluate the coatings and films prepared according to the invention.

Methyl Ethyl Ketone Resistance

Methyl ethyl ketone (MEK) Resistance was reported as MEK rubs (one set of back and forth). MEK rubs were measured by securing multiple layers of cheesecloth over the round head of a 16 ounce (454 g) ball pin hammer. The hammer is then attached to a mechanical device which moves the hammer back and forth. The cheesecloth is saturated with MEK. The panel is rubbed with the soaked cloth to the point of first breakthrough to the substrate.

Pendulum Hardness

Pendulum hardness was measured using a Gardner Pendulum Hardness Tester.

Tukon Hardness

Tukon Hardness was determined according to ASTM D1474-92.

Film Gel Fraction/Swell Ratio

Film swell ratios (FSR) were obtained by determining the ratio of insoluble polymer weight fraction swollen in acetone (by weight) to dry weight of the insoluble weight fraction in a dry film sample.

The procedure used is as follows: for each sample determination, a 4"×4" 325-mesh steel screen and a metal weighing boat are baked in the oven, cooled for 30 minutes and weighed (W1 and W2, respectively). After the latex film is dried and kept for the required number of days at room temperature, a piece of the film is cut, weighed (W3), placed in an aluminum pan, and put aside. Another film sample is cut, weighed (W4) and placed in a screw cap jar with excess solvent on a shaker bath for 16 hours at constant temperature. The film gel is recovered by pouring the solution plus wet solids through the screen and weighing the screen plus retained wet solids (W5). At this point the screen plus solids and the film sample are dried in the aluminum boat in a vacuum oven at 80° C. to constant weight and the weight for the screen plus dry solids (W6) and the film sample in the aluminum boat (W7) obtained. Calculations are shown below.

$$FGF=(W6-W1)/[W4*((W7-W2)/W3)] \quad FSR=(W5-W1)/(W6-W1)$$

EXAMPLES 1–8
Preparation of KELSOL Alkyd/acrylic Hybrids

A series of alkyd/acrylic hybrids was prepared using the KELSOL dispersible alkyd resins shown in Table 1. The hybrids differ in LOF level, alkyd level, and alkyd type.

A general procedure for the preparation of these materials is as follows: To a 500 ml reactor, appropriate amounts of demineralized water and alkyd were added, along with sufficient ammonium hydroxide to adjust to pH 8.0. These reactor contents were heated to 82° C. at which time 2.06 g Dowfax 2A1 (sodium dodecyl diphenyloxide disulfonate available from Dow Chemical) and 0.93 g ammonium persulfate in 22 g water was added to the reactor over 240 minutes. Simultaneously, 176 g of the monomer mixture shown in Table 18 was added over 225 minutes. At the end of the 225 minutes, 9 g of methyl methacrylate was added over 15 minutes. After completion of the additions, the reactor was held at 82° C. for one hour, then cooled to room temperature. Finally, 0.2 g of tert-butyl hydroperoxide in 2.75 g water and 0.2 g of sodium formaldehyde sulfoxylate in 2.75 g water were added to the latex with mixing. The latex was then filtered through a 100 mesh wire screen. The particle size, pH, and percent solids of the resulting hybrid latexes are shown in Table 2.

TABLE 1

KELSOL dispersible alkyd resins

| KELSOL Alkyd | Percent Solids | Acid Number |
|---|---|---|
| 3922-G-80 | 80 | 52–58 |
| 3960-B2G-75 | 75 | 37–41 |
| 3964-B2G-70 | 70 | 38–42 |
| 3904-BG4-75 | 75 | 38–42 |

EXAMPLE 9
Film Gel Fractions and Film Swell Ratios of Examples 1–8

For each latex of Examples 1–8, to 50 g latex was added 0.32 g of 28% ammonium hydroxide, 2.7 g of a 25% aqueous solution of TERGITOL 15-S-40, 1.1 g of TEXANOL, and 0.45 g of Cobalt HYDROCURE II. Films were cast and air dried at room temperature for one week. Film gel fractions (FGF) and film swell ratios (FSR) were determined as above, except using tetrahydrofuran (THF) as the solvent instead of acetone. The results are summarized in Table 3.

Example 1 as the non-functional control had a much higher FSR and a much lower FGF than the systems containing AAEM as the LOF. Example 3 which had the highest level of LOF had the lowest FSR and the highest FGF.

TABLE 3

Film Swell Ratios and Film Gel Fractions of Examples 1–8

| Latex Example | Film Swell Ratio | Film Gel Fractions |
|---|---|---|
| 1 | 33.9 | 0.36 |
| 2 | 8.7 | 0.80 |
| 3 | 3.9 | 0.89 |
| 4 | 6.6 | 0.81 |
| 5 | 6.3 | 0.82 |
| 6 | 17.1 | 0.57 |
| 7 | 15.3 | 0.62 |
| 8 | 9.2 | 0.76 |

EXAMPLE 10
Preparation of Alkyd Resin

Into a three-liter, three-neck, round-bottom flask equipped with a mechanical stirrer, a steam-jacketed partial condenser, a Dean-Stark trap, a nitrogen inlet, and a water condenser were charged neopentyl glycol (343.9 g, 3.31 mol), phthalic anhydride (491.9 g, 3.33 mol), pentaerythritol (246.7 g, 1.81 mol), PAMOLYN 200 (tall oil fatty acid, available from Hercules, Inc., Wilmington, Del.) (1040.1 g, 3.59 mol), FASCAT 4100 (1.66 g), and xylene (85.0 g). The reaction temperature was gradually increased to 180° C. over 1.5 hours, then to 230° C. over another 1.5 hours. The reaction was allowed to continue until an acid number 3 was obtained. The resulting alkyd resin was cooled and subsequently isolated.

EXAMPLES 11–24
General Procedure for the Preparation of Latexes from Sheared LOF Acrylic-Modified Alkyd Hybrid Resins

TABLE 2

| Latex | KELSOL Alkyd Type | Wt % Alkyd[1] | Monomer Mixture Ratio MMA/BA/AAEM[2] | Particle Size (nm) | pH | Tg (° C.) | Scrap (gm) | Percent Solids |
|---|---|---|---|---|---|---|---|---|
| 1 | 3922-G-80 | 9.1 | 60/40 | 60 | 6.0 | 27 | 14.5 | 47.1 |
| 2 | 3922-G-80 | 9.1 | 55/35/10 | 68 | 5.4 | 37 | 2.3 | 44.8 |
| 3 | 3922-G-80 | 9.1 | 50/30/20 | 82 | 5.5 | 38 | 5.9 | 47.0 |
| 4 | 3922-G-80 | 16.7 | 55/35/10 | 48 | 6.0 | 31 | 1.4 | 44.9 |
| 5 | 3922-G-80 | 23.1 | 55/35/10 | 41 | 6.2 | 29 | 2.9 | 44.9 |
| 6 | 3960-B2G-75 | 9.1 | 55/35/10 | 92 | 5.7 | — | 22.1 | 44.9 |
| 7 | 3964-B2G-70 | 9.1 | 55/35/10 | 78 | 5.5 | — | 4.6 | 44.9 |
| 8 | 3904-BG4-75 | 9.1 | 55/35/10 | 85 | 5.7 | — | 4.8 | 45.1 |

[1]Wt % based on total polymer solids.
[2]MMA- methyl methacrylate; BA- butyl acrylate; AAEM- acetoacetoxyethyl methacrylate.

For each of examples 11–24, to a reactor consisting of a 1000 mL resin kettle equipped with a condenser, nitrogen purge, and a subsurface feed tube were added 148 g of water. A nitrogen purge was begun and the contents heated and maintained at 80° C. An alkyd of Example 10 or a commercially available alkyd (e.g. Duramac HS 57-5866, McWhorter Technologies Inc., Chicago, Ill.; Ranbar 4495-100, Ranbar Technology Inc., Glenshaw, Pa.) was added to a monomer mix (see Table 4) and dissolved to form a monomer/alkyd mixture. Water and surfactant(s) were premixed, then the monomer/alkyd mixture was added to form a pre-emulsion. The pre-emulsion was sheared using an IKA (Model SD-45) rotor/stator homogenizer by pumping through a flow cell which surrounded the shearing device (approximately 3 minute residence time) with the homogenizer operating at 100% output to form a mini-emulsion. A portion of the mini-emulsion (74.8 g, 10%) was charged to the reactor. Ammonium persulfate (0.53 g) was mixed in water (10 g) and charged to the reactor. After 15 minutes the remaining mini-emulsion was fed over 180 minutes to the reactor. Simultaneously, an initiator feed composed of water (70.0 g), ammonium persulfate (0.73 g), and ammonium carbonate (0.73 g) was also fed over 180 minutes at 0.40 g/min. After the feeds ended, the reactor was held at 80° C. for 15 minutes, then a reductant solution consisting of water (6.5 g), isoascorbic acid (1.32 g), and 0.5% iron sulfate heptahydrate (1.60 g) was added to the reactor. A solution of water (10.50 g) and 70% t-butyl hydroperoxide (1.46 g) was then fed over 45 minutes. The reaction mixture was then cooled. In some cases a nonionic surfactant (Tergitol 15-S-40) was post-added. (See Table 4) The latex was then filtered through a 100 mesh wire screen and filterable solids or scrap collected. The droplet size of the mini-emulsion, particle size, viscosity (Brookhaven), and pH of the resulting waterborne alkyd/acrylic hybrid resin latexes were determined. The droplet and particle sizes were measured using Mictrotrac UPA laser light-scattering device (180° backscattering). The droplets were diluted approximately 1:50 in a monomer saturated water solution. The particles were diluted approximately 1:50 in water. Latex property data are summarized in Table 5.

Comparative Example 1

General Procedure for the Preparation of Latexes from Non-Sheared LOF Acrylic-Modified Alkyd Hybrid Resins To a reactor consisting of a 1000 mL resin kettle equipped with a condenser, nitrogen purge, and a subsurface feed tube were added water (50 g). A nitrogen purge was begun and the contents heated to 80° C. The alkyd obtained from Example 10 was added to the monomer mix (Table 4), and dissolved to form a monomer/alkyd mixture. Water and surfactant(s) were premixed, then the monomer/alkyd mixture was added to form a pre-emulsion. The pre-emulsion was NOT sheared to form a mini-emulsion. The pre-emulsion (54.0 g, 10%) was charged to the reactor. Ammonium persulfate (0.20 g) and ammonium carbonate (0.29 g) was mixed in water (4.0 g) and charged to the reactor. After 15 minutes the remaining pre-emulsion was fed over 180 minutes to the reactor. Simultaneously, an initiator feed composed of water (35.0 g) and ammonium persulfate (0.21 g) was also fed at 0.20 g/min. After the feeds ended, the reactor was held for 15 minutes, then a reductant solution consisting of water (2.75 g), isoascorbic acid (0.28 g), and 0.5% iron sulfate heptahydrate (0.40 g) was added to the reactor. A solution of water (5.00 g) and 70% t-butyl hydroperoxide (0.20 g) was then fed over 30 minutes. The reaction mixture was then cooled. The latex was filtered through a 100 mesh wire screen and filterable solids or scrap were collected. Very high levels of scrap (Table 5) occurred with this run due to precipitation of a significant portion of the alkyd. Thus homogenization of the emulsion is required in order to form a stable latex containing a preformed hydrophobic polymer such as an alkyd.

TABLE 4

| Example | Monomer Wt. % (BOM) | Surfactant(s) Wt. % (BOM + alkyd) | Post-addition of non-ionic Tergitol 15S-40 (70%) | Alkyd Type | Alkyd Wt. % (BOM + alkyd) |
|---|---|---|---|---|---|
| 11 | MMA/BA/AAEM/MAA 55.5/41.5/0.0/3.0 | 1.0% sodium dodecyl sulfate, 2.2% Tergitol 15-S-40 (70%) | n/a | Example 10 | 25.6 |
| 12 | Sty/EHA/AAEM/MAA 50.0/27.0/20.0/3.0 | 1.0% sodium dodecyl sulfate | 17.2 g (diluted 1:1 water:surf) | Example 10 | 25.6 |
| 13 | Sty/EHA/AAEM/MAA 68.5/27.5/0.0/4.0 | 1.5% Aerosol OT-NV | 17.6 g (diluted 1:1 water:surf) | Duramac HS 57-5866 | 20.0 |
| 14 | MMA/BA/AAEM/MAA 44.5/32.5/20.0/3.0 | 1.1% Dowfax 2A1 | 12.6 g (diluted 1:1 water:surf) | Duramac HS 57-5866 | 25.6 |
| 15 | Sty/EHA/AAEM/MAA 68.5/27.5/0.0/4.0 | 1.5% Aerosol OT-NV | 17.6 g (diluted 1:1 water:surf) | Example 10 | 46.0 |
| 16 | Sty/EHA/AAEM/MAA 56.2/19.8/20.0/4.0 | 1.5% Aerosol OT-NV | 17.6 g (diluted 1:1 water:surf) | Example 10 | 46.0 |
| 17 | Sty/EHA/ALMA/MAA 62.3/23.7/10.0/4.0 | 1.5% Aerosol OT-NV | 17.6 g (diluted 1:1 water:surf) | Example 10 | 46.0 |
| 18 | Sty/EHA/ALMA/MAA 68.5/27.5/0.0/4.0 | 1.5% Aerosol OT-NV | 17.6 g (diluted 1:1 water:surf) | Duramac HS 57-5866 | 46.0 |
| 19 | Sty/EHA/ALMA/MAA 62.3/23.7/10.0/4.0 | 1.5% Aerosol OT-NV | 17.6 g (diluted 1:1 water:surf) | Duramac HS 57-5866 | 46.0 |
| 20 | Sty/EHA/AAEM/MAA 62.3/23.7/10.0/4.0 | 1.5% Aerosol OT-NV | 17.6 g (diluted 1:1 water:surf) | Example 10 | 46.0 |
| 21 | Sty/EHA/AAEM/MAA 50.0/16.0/30.0/4.0 | 1.5% Aerosol OT-NV | 17.6 g (diluted 1:1 water:surf) | Example 10 | 46.0 |
| 22 | Sty/MMA/EHA/AAEM/MAA 33.3/33.3/28.4/0.0/5.0 | 1.5% Aerosol OT-NV | 17.6 g (diluted 1:1 water:surf) | Ranbar 4495-100 | 46.0 |

TABLE 4-continued

| Example | Monomer Wt. % (BOM) | Surfactant(s) Wt. % (BOM + alkyd) | Post-addition of non-ionic Tergitol 15S-40 (70%) | Alkyd Type | Alkyd Wt. % (BOM + alkyd) |
|---|---|---|---|---|---|
| 23 | Sty/MMA/EHA/AAEM/ MAA 30.2/30.2/24.6/10.0/5.0 | 1.5% Aerosol OT-NV | 17.6 g (diluted 1:1 water:surf) | Ranbar 4495-100 | 46.0 |
| 24 | Sty/MMA/EHA/AAEM/ MAA 27.2/27.2/ 20.7/20.0/5.0 | 1.5% Aerosol OT-NV | 17.6 g (diluted 1:1 water:surf) | Ranbar 4495-100 | 46.0 |
| Comp. Ex. 1 | MMA/Sty/BA/MAA 31.8/31.8/31.8/4.6 | 1.1% sodium dodecyl sulfate | n/a | Example 10 | 23.1 |

BOM = based on monomer; BOM + alkyd = based on monomer + alkyd
Total solids = 40%
MMA = methyl methacrylate, Sty = styrene, BA = butyl acrylate, EHA = 2-ethylhexyl acrylate, AAEM = acetoacetoxy ethyl methacrylate, ALMA = allyl methacrylate, MAA = methacrylic acid
Duramac HS 57-5866 = McWhorter alkyd (90% solids in mineral spirits), long oil (sunflower oil)
Ranbar 4495-100 = Ranbar alkyd (100% solids), long oil (TOFA)

TABLE 5

Property Data of Latexes from Examples 11–24

| Example | Droplet Size (nm) | Particle Size (nm) | pH | Viscosity (cps) | Scrap (ppm) |
|---|---|---|---|---|---|
| 11 | 225 | 175 | 5.0 | <10 | 34 |
| 12 | 270 | 132 | 4.6 | <10 | 3 |
| 13 | 450 | 210 | 4.5 | <10 | 31 |
| 14 | 250 | 270 | 4.4 | <10 | 100 |
| 15 | 320 | 180 | 4.5 | <10 | 16 |
| 16 | 340 | 170 | 4.5 | <10 | 88 |
| 17 | 360 | 170 | 3.7 | <10 | 3 |
| 18 | 500 | 180 | 4.8 | <10 | 12 |
| 19 | 420 | 220 | 4.2 | <10 | 3 |
| 20 | 340 | 174 | 4.2 | <10 | 56 |
| 21 | 320 | 170 | 4.2 | <10 | 5 |
| 22 | 350 | 220 | 4.2 | <10 | 7 |
| 23 | 320 | 200 | 4.5 | <10 | 2 |
| 24 | 340 | 220 | 4.2 | <10 | 11 |
| Comp. Ex. 1 | n/a | n/a | — | — | >10,000 |

EXAMPLES 25–38
Formulation(s) for Paints

Paint Examples 25–38 were made from, respectively, each of the latexes generated in examples 11–24. The paint formulations and paint properties are summarized in Tables 6 and 7. Paint Examples 25 and 26 were formulated by adding the corresponding latex (65.8 g), adjusting the pH to 8.5 using 28% ammonium hydroxide, and adding TIPURE-746 (23.9 g, titanium pure slurry, Dupont), PM acetate (10.0 g, propyleneglycol monomethylether, Eastman), Acrosol RM-825 (1.5 g, thickener), and Hydrocure II (1.0 g, OMG, 5% Co metal catalyst).

Paint Example 27 was formulated by adding the latex of Example 13 (65.8 g), adjusting the pH to 8.5 using 28% ammonium hydroxide, and adding TIPURE-746 (23.9 g, titanium pure slurry, Dupont), 50:50 Eastman EB: Eastman DB (7.9 g), SANTICIZER 160 (1.3 g, plasticizer, Monsanto Co., St. Louis, Mo.), ACROSOL RM-825 (0.5 g, thickener) and SER-AD FA379 (0.25 g, flash rust inhibitor, Huls America Inc., Somerset, N.J.). Paint Example 28 was formulated by adding the latex of Example 14 (65.8 g), adjusting the pH to 8.5 using 28% ammonium hydroxide, and adding TIPURE-746 (23.9 g, titanium pure slurry, Dupont), PM acetate (10.0 g, coalescent), ACROSOL RM-825 (0.9 g, thickener) and diethyl maleate (1.28 g, coalescent, Aldrich). Neither paint Example 27 or 28 contained a catalyst.

Paint Examples 29–38 were formulated by adding the corresponding latex of Examples 15–24 (65.8 g), adjusting the pH to 8.5 using 28% ammonium hydroxide, and adding TIPURE R-746 (23.9 g, titanium pure slurry, Dupont), 50:50 Eastman EB: Eastman DB (5.3 g), Acrosol RM-825 (0.5 g, thickener), Hydrocure II (0.5 g, OMG, 5% Co metal catalyst) and SER-AD FA379 (0.25 g, flash rust inhibitor, Huls, America Inc.).

As shown in Table 6, Examples 25–30 and 36–38 reveal that incorporation of acetoacetoxy methacrylate (AAEM) as a latent oxidative functional monomer leads to significant improvements in MEK double rubs. Examples 29–30 and 36–38 further demonstrate that not only are MEK double rubs improved, but the hardness is substantially higher when AAEM is present. Examples 29 and 30 further show that hardness increases when AAEM is present for samples tested for water resistance by immersing the paint in 60° C. water for 1 hour, then allowing the paint to recover for 3 hours.

As shown in Table 7, Paint Examples 29 and 31–33 show that incorporation of allyl methacrylate (ALMA) also leads to significant improvements in MEK double rubs, especially when the paint is baked. Improvements in hardness are also realized with ALMA present.

EXAMPLES 39–42
Formulation(s) for Clear Films

As shown in Table 8, for each clear film of Examples 39–42 based on, respectively, latex examples 15, 16, 20, and 21 (made with the alkyd in Example 10), incorporation of a latent oxidative functional monomer increases the gel fraction (and decreases the swell ratio), thus demonstrating the effect of the LOF monomer on enhancing crosslinking after film formation. The gel fraction/swell ratio measurements of each clear film were made by adjusting the pH to 8.5 using 28% ammonium hydroxide. No catalyst was used. All films were drawn down to about 1 mil thickness and were cured for 1 and/or 2 weeks at ambient conditions. Films that were baked were done so after curing at ambient conditions for 2 weeks. They were then placed in a convection oven at 150° C. for 30 minutes.

TABLE 6

Paint Formulations

| Paint Ex | Latex Ex | Alkyd Type | Alkyd Level (BOM + alkyd) | AAEM level | MEK DR 1 wk | MEK DR 2 wk | MEK DR 2 wk bake | Hardness Tukon 1 wk | Hardness Tukon 2 wk | Hardness Tukon 2 wk bake | Pendulum 1 wk | Pendulum 2 wk | Pendulum 2 wk bake | Pencil 1 wk | Pencil 2 wk | Water Resist. 3hr recov. 1 wk | Water Resist. 3hr recov. 2 wk |
|---|---|---|---|---|---|---|---|---|---|---|---|---|---|---|---|---|---|
| 25 | 11 | Example 10 | 25 | 0 | — | 10 | — | | | | | | | | | | |
| 26 | 12 | Example 10 | 25 | 20 | — | 52 | — | | | | | | | | | | |
| 27 | 13 | Duramac 57-5866 | 20 | 0 | 3 | — | — | | | | | | | | | | |
| 28 | 14 | Duramac 57-5866 | 25 | 20 | — | 137 | — | | | | | | | | | | |
| 29 | 15 | Example 10 | 46 | 0 | 3 | 4 | 4 | 3.0 | 3.7 | 8.4 | 27 | 32 | 59 | 3B | 3B | 3B | 3B |
| 30 | 16 | Example 10 | 46 | 20 | 17 | 6 | 133 | 3.7 | 5.6 | 10.6 | 38 | 40 | 81 | B | B | HB | B |
| 36 | 22 | Ranbar 4495-100 | 46 | 0 | 5 | 4 | 4 | 4.2 | 4 | 10.1 | 31 | 35 | 63 | | | | |
| 37 | 23 | Ranbar 4495-100 | 46 | 10 | 37 | 16 | 75 | 6.1 | 6 | 12.4 | 35 | 39 | 73 | | | | |
| 38 | 24 | Ranbar 4495-100 | 46 | 20 | 14 | 50 | 206 | 6.4 | 6.6 | 12.6 | 42 | 46 | 69 | | | | |

BOM = based on monomer; BOM + alkyd = based on monomer + alkyd
AAEM = acetoacetoxy ethyl methacrylate
Duramac 57-5866 = McWhorter alkyd (90% solids in mineral spirits), long oil (sunflower oil)
Ranbar 4495-100 = Ranbar alkyd (100% solids), long oil (TOFA)

TABLE 7

Paint Formulations

| Paint Ex | Latex Ex | Alkyd Type | Alkyd Level (BOM + alkyd) | ALMA level | MEK DR 1 wk | MEK DR 2 wk | MEK DR 2 wk bake | Hardness Tukon 1 wk | Hardness Tukon 2 wk | Hardness Tukon 2 wk bake | Pendulum 1 wk | Pendulum 2 wk | Pendulum 2 wk bake |
|---|---|---|---|---|---|---|---|---|---|---|---|---|---|
| 29 | 15 | Example 10 | 46 | 0 | 3 | 4 | 4 | 3.0 | 3.7 | 8.4 | 27 | 32 | 59 |
| 31 | 17 | Example 10 | 46 | 10 | 4 | 4 | 103 | 2.1 | 2.6 | 6.9 | 17 | 22 | 54 |
| 32 | 18 | Duramac 57-5866 | 46 | 0 | 4 | 3 | 5 | 4.2 | 4.4 | 7.7 | 30 | 36 | 56 |
| 33 | 19 | Duramac 57-5866 | 46 | 10 | 8 | 11 | 87 | 4.8 | 5.9 | 11.6 | 30 | 33 | 52 |

BOM + alkyd = based on monomer + alkyd
ALMA = allyl methacrylate
Duramac HS 57-5866 = McWhorter alkyd (90% solids in mineral spirits), long oil (sunflower oil)

TABLE 8

Clear Films

| Clear Film Ex | Latex Ex | Alkyd Type | Alkyd Level (BOM + alkyd) | AAEM level | Gel Fraction 1 wk | Gel Fraction 2 wk | Gel Fraction 2 wk bake | Swell Ratio 1 wk | Swell Ratio 2 wk | Swell Ratio 2 wk bake |
|---|---|---|---|---|---|---|---|---|---|---|
| 39 | 15 | Example 10 | 46 | 0 | 2 | 19 | 42 | 80 | 48 | 12 |
| 40 | 20 | Example 10 | 46 | 10 | 25 | 46 | 85 | 92 | 37 | 10 |
| 41 | 16 | Example 10 | 46 | 20 | 48 | 64 | 88 | 27 | 20 | 8 |
| 42 | 21 | Example 10 | 46 | 30 | 40 | 55 | 86 | 33 | 17 | 7 |

BOM + alkyd based on monomer + alkyd
AAEM = acetoacetoxy ethyl methacrylate

EXAMPLES 43–46

General Procedure for the Preparation of Latexes from Sheared LOF Acrylic-Modified Uralkyd Hybrid Resins For each of latex examples 43–46, to a reactor consisting of a 1000 mL resin kettle equipped with a condenser, nitrogen purge, and a subsurface feed tube were added 148 g of water. A nitrogen purge was begun and the contents heated and maintained at 80° C. A commercially available uralkyd (e.g. SPENKEL F87-M80 available from Reichhold Chemicals of Research Triangle Park, North Carolina and CARBAMAC 57-5794 available from McWhorter Technologies, Inc. of Chicago, Ill.) was added to a monomer mix (see Table 9) and dissolved to form a monomer/uralkyd mixture. Water and surfactant(s) were premixed, then the monomer/uralkyd mixture was added to form a pre-emulsion. The pre-emulsion was sheared using an IKA (Model SD-45) rotor/stator homogenizer by pumping through a flow cell which surrounded the shearing device (approximately 3 minute residence time) with the homogenizer operating at 100% output to form a mini-emulsion. A portion of the mini-emulsion (74.8 g, 10%) was charged to the reactor. Ammonium persulfate (0.53 g) was mixed in water (10 g) and charged to the reactor. After 15 minutes the remaining mini-emulsion was fed over 180 minutes to the reactor. Simultaneously, an initiator feed composed of water (70.0 g), ammonium persulfate (0.73 g), and ammonium carbonate (0.73 g) was also fed over 180 minutes at 0.40 g/min. After the feeds ended, the reactor was held at 80° C. for 15 minutes, then a reductant solution consisting of water (6.5 g), isoascorbic acid (1.32 g), and 0.5% iron sulfate heptahydrate (1.60 g) was added to the reactor. A solution of water (10.50 g) and 70% t-butyl hydroperoxide (1.46 g) was then fed over 45 minutes. The reaction mixture was then cooled. In some cases a nonionic surfactant (Tergitol 15-S-40) was post-added. (See Table 9) The latex was then filtered through a 100 mesh wire screen and filterable solids or scrap collected. The droplet size of the mini-emulsion, particle size, viscosity (Brookhaven), and pH of the resulting waterborne uralkyd/acrylic hybrid resin latexes were determined. The droplet and particle sizes were measured using Mictrotrac UPA laser light-scattering device (1800 backscattering). The droplets were diluted approximately 1:50 in a monomer saturated water solution. The particles were diluted approximately 1:50 in water. Latex property data are summarized in Table 10.

TABLE 10-continued

Property Data of Latex Examples 43–46

| Latex Example | Uralkyd Type | Droplet Size (nm) | Particle Size (nm) | pH | Viscosity (cps) | Scrap (ppm) |
|---|---|---|---|---|---|---|
| 44 | Spenkel F87-M80 | 410 | 180 | 5.2 | <10 | 114 |
| 45 | Carbamac 57-5794 | 430 | 215 | 4.3 | <10 | 89 |
| 46 | Carbamac 57-5794 | 440 | 195 | 4.3 | <10 | 117 |

EXAMPLES 47–50

Formulations for Paints

As shown in Table 11, Paint Examples 47–50 were formulated by adding the corresponding latex (65.8 g),

TABLE 9

| Latex Example | Monomer Wt. % (BOM) | Surfactant(s) Wt. % (BOM + uralkyd) | Post-addition of non-ionic Tergitol 15 S-40 (70%) | Uralkyd Type | Uralkyd Wt. % (BOM + uralkyd) |
|---|---|---|---|---|---|
| 43 | Sty/EHA/AAEM/MAA 65.1/30.7/0.0/4.2 | 1.5% Aerosol OT-NV | None | Spenkel F87-M80 | 40.0 |
| 44 | Sty/EHA/AAEM/MAA 54.8/24.3/16.7/4.2 | 1.5% Aerosol OT-NV | None | Spenkel F87-M80 | 40.0 |
| 45 | Sty/EHA/AAEM/MAA 65.1/30.7/0.0/4.2 | 1.5% Aerosol OT-NV | None | Carbamac 57-5794 | 40.0 |
| 46 | Sty/EHA/AAEM/MAA 44.5/18.0/33.3/4.2 | 1.5% Aerosol OT-NV | None | Carbamac 57-5794 | 40.0 |

BOM = based on monomer; BOM + uralkyd = based on monomer + uralkyd
Total solids = 40%
Sty = styrene, EHA = 2-ethylhexyl acrylate, AAEM = acetoacetoxy ethyl methacrylate, MAA = methacrylic acid

TABLE 10

Property Data of Latex Examples 43–46

| Latex Example | Uralkyd Type | Droplet Size (nm) | Particle Size (nm) | pH | Viscosity (cps) | Scrap (ppm) |
|---|---|---|---|---|---|---|
| 43 | Spenkel F87-M80 | 480 | 200 | 5.2 | <10 | 94 | adjusting the pH to 8.5 using 28% ammonium hydroxide, and adding TIPURE R-746 (27.3 g, titanium pure slurry, Dupont), propylene glycol butyl ether (PnB) (5.5.g, Dow Chemical, Midland, Mich.), Hydrocure II (0.5 g, OMG, 0.5% Co metal catalyst).

TABLE 11

Paint Formulations

| | | | | MEK DR | | | Tukon | | | Pendulum | | | Pencil | | |
|---|---|---|---|---|---|---|---|---|---|---|---|---|---|---|---|
| Paint Ex | Latex Ex | Uralkyd Type | AAEM (BOM) | 1 wk | 2 wk | 2 wk bake | 1 wk | 2 wk | 2 wk bake | 1 wk | 2 wk | 2 wk bake | 1 wk | 2 wk | 2 wk bake |
| 47 | 43 | Spenkel F87-M80 | 0 | 3 | 4 | 3 | 4.3 | 6.2 | 14.4 | 39 | 50 | 88 | F | B | B |
| 48 | 44 | Spenkel F87-M80 | 16.7 | 4 | 3 | 43 | 5.5 | 7.0 | 17.3 | 53 | 53 | 103 | HB | HB | F |
| 49 | 45 | Carbamac 57-5794 | 0 | 3 | 2 | 3 | 2.7 | 3.8 | 11.7 | 26 | 42 | 106 | B | B | HB |

TABLE 11-continued

Paint Formulations

| Paint Ex | Latex Ex | Uralkyd Type | AAEM (BOM) | MEK DR | | | Hardness | | | | | | | | |
|---|---|---|---|---|---|---|---|---|---|---|---|---|---|---|---|
| | | | | | | | Tukon | | | Pendulum | | | Pencil | | |
| | | | | 1 wk | 2 wk | 2 wk bake | 1 wk | 2 wk | 2 wk bake | 1 wk | 2 wk | 2 wk bake | 1 wk | 2 wk | 2 wk bake |
| 50 | 46 | Carbamac 57-5794 | 33.3 | 4 | 3 | 906 | 2.5 | 3.7 | 17 | 25 | 45 | 133 | B | B | H |

BOM = based on monomer
AAEM = acetoacetoxy ethyl methacrylate

EXAMPLES 51–54

Formulation(s) for Clear Films

As shown in Table 12, for each clear film of Examples 51–54 based on, respectively, latex examples 43–46 incorporation of a latent oxidative functional monomer increases the gel fraction (and decreases the swell ratio), thus demonstrating the effect of the LOF monomer on enhancing crosslinking after film formation. The gel fraction/swell ratio measurements of each clear film were made by adjusting the pH to 8.5 using 28% ammonium hydroxide. No catalyst was used. All films were drawn down to about 1 mil thickness and were cured for 1 and/or 2 weeks at ambient conditions. Films that were baked were done so after curing at ambient conditions for 2 weeks. They were then placed in a convection oven at 150° C. for 30 minutes.

TABLE 12

Clear Films

| Clear Film Ex | Latex Ex | Uralkyd Type | Uralkyd Wt. % (BOM + uralkyd) | AAEM level (BOM) | Gel Fraction | | | Swell Ratio | | |
|---|---|---|---|---|---|---|---|---|---|---|
| | | | | | 1 wk | 2 wk | 2 wk bake | 1 wk | 2 wk | 2 wk bake |
| 51 | 43 | Spenkel F87-M80 | 40.0 | 0 | 1.53 | 1.77 | 2.07 | 74.54 | 15.28 | 21.91 |
| 52 | 44 | Spenkel F87-M80 | 40.0 | 16.7 | 2.12 | 17.96 | 74.60 | 18.79 | 13.49 | 7.47 |
| 53 | 45 | Carbamac 57-5794 | 40.0 | 0 | 1.14 | 0.92 | 1.47 | 37.33 | xx | 54.03 |
| 54 | 46 | Carbamac 57-5794 | 40.0 | 33.3 | 1.43 | 1.24 | 26.95 | 30.86 | 46.31 | 39.14 |

BOM + uralkyd = based on monomer + uralkyd; BOM = based on monomer
AAEM = acetoacetoxy ethyl methacrylate It should be understood that the foregoing discussion and examples merely present a detailed description of certain preferred embodiments. It therefore should be apparent to those of ordinary skill in the art that various modifications and equivalents can be made without departing from the spirit and scope of the invention. All references, articles and patents identified above or below are herein incorporated by reference in their entirety.

What is claimed is:

1. A latent oxidatively-functional-modified alkyd or uralkyd comprising the polymerization product of a sheared mini-emulsion comprising a solvent-borne alkyd or uralkyd dissolved in at least one latent oxidatively-functional monomer, wherein the resulting latent oxidatively-functional-modified alkyd or uralkyd possesses sufficient available latent oxidatively-functional groups to increase the effective oxidative crosslinking of said latent oxidatively-functional-modified alkyd or uralkyd upon application to a substrate.

2. A latent oxidatively-functional-modified alkyd or uralkyd of claim 1, wherein said latent oxidatively-functional group is selected from the group consisting of allyl, vinyl, acetoacetyl, and enamine.

3. A latent oxidatively-functional-modified alkyd or uralkyd of claim 1, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

4. A latent oxidatively-functional-modified alkyd or uralkyd of claim 1, wherein at least one latent oxidatively-functional monomer is copolymerized with at least one ethylenically unsaturated co-monomer in the presence of said solvent-borne alkyd or uralkyd.

5. A latent oxidatively-functional-modified alkyd or uralkyd of claim 4, wherein said ethylenically unsaturated co-monomer is selected from the group consisting of styrene, α-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, t-butylaminoethyl methacrylate, dimethylaminoethyl methacrylate, diethylaminoethyl methacrylate, N,N'-dimethylaminopropyl methacrylamide, 2-t-butylaminoethyl methacrylate, N,N'-dimethylaminoethyl acrylate, N-(2-methacryloyloxy-ethyl)ethylene urea, and methacrylamidoethylethylene urea.

6. A latent oxidatively-functional-modified alkyd or uralkyd of claim 5, wherein said ethylenically unsaturated co-monomer is selected from the group consisting of styrene, α-methyl styrene, vinyl naphthalene, vinyl toluene, and chloromethyl styrene.

7. A water-based latex comprising water and a latent oxidatively-functional-modified alkyd or uralkyd comprising the polymerization product of a sheared mini-emulsion comprising a solvent-borne alkyd or uralkyd dissolved in at least one latent oxidatively-functional monomer, wherein said latent oxidatively-functional-modified alkyd or uralkyd of the resulting latex possesses sufficient available latent oxidatively-functional groups to increase the effective oxidative crosslinking of said latent oxidatively-functional-modified alkyd or uralkyd upon application of the latex to a substrate.

8. A water-based latex of claim 7, wherein said latent oxidatively-functional-modified alkyd or uralkyd comprises about 5–60 wt % of said solvent-borne alkyd or uralkyd based on the total solids of the latex and about 40–95 wt % of the latent oxidatively-functional monomer based on the total solids of the latex.

9. A water-based latex of claim 7, further comprising a co-surfactant and wherein said solvent-borne alkyd or uralkyd comprises about 5–35 wt % of the total solids of the latex.

10. A water-based latex of claim 7, wherein said latent oxidatively-functional group is selected from the group consisting of allyl, vinyl, acetoacetyl, and enamine.

11. A water-based latex of claim 7, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

12. A water-based latex of claim 7, wherein at least one latent oxidatively-functional monomer is copolymerized with at least one ethylenically unsaturated co-monomer in the presence of said solvent-borne alkyd or uralkyd.

13. A water-based latex of claim 12, wherein said ethylenically unsaturated co-monomer is selected from the group consisting of styrene, α-methyl styrene, vinyl naphthalene, vinyl toluene, chloromethyl styrene, methyl acrylate, acrylic acid, methacrylic acid, methyl methacrylate, ethyl acrylate, ethyl methacrylate, butyl acrylate, butyl methacrylate, isobutyl acrylate, isobutyl methacrylate, ethylhexyl acrylate, ethylhexyl methacrylate, octyl acrylate, octyl methacrylate, glycidyl methacrylate, carbodiimide methacrylate, alkyl crotonates, vinyl acetate, di-n-butyl maleate, di-octylmaleate, t-butylaminoethyl methacrylate, dimethylaminoethyl methacrylate, diethylaminoethyl methacrylate, N,N'-dimethylaminopropyl methacrylamide, 2-t-butylaminoethyl methacrylate, N,N'-dimethylaminoethyl acrylate, N-(2-methacryloyloxy-ethyl)ethylene urea, and methacrylamidoethylethylene urea.

14. A coating composition comprising a water-based latex of claim 7 and at least one additive selected from the group consisting of rheology agents, flow control agents, extenders, reactive coalescing aids, plasticizers, flatting agents, pigment wetting and dispersing agents, surfactants, ultraviolet (UV) absorbers, UV light stabilizers, tinting pigments, colorants, defoaming agents, antifoaming agents, anti-settling, anti-sag and bodying agents, anti-skinning agents, anti-flooding agents, anti-floating agents, biocides, fungicides, mildewcides, corrosion inhibitors, thickening agents, and coalescing agents.

15. A method of preparing a water-based latex comprising the step of polymerizing a sheared mini-emulsion comprising a solvent-borne alkyd or uralkyd dissolved in at least one latent oxidatively-functional monomer, wherein said polymerizing step is conducted under conditions sufficient for the survival of the latent oxidative functionality of said monomer such that the latent oxidatively-functional-modified alkyd or uralkyd of the resulting latex possesses sufficient available latent oxidatively-functional groups to increase the effective oxidative crosslinking of said latent oxidatively-functional-modified alkyd or uralkyd upon application of said latex to a substrate.

16. A method of claim 15, wherein said latent oxidatively-functional group is selected from the group consisting of allyl, vinyl, acetoacetyl, and enamine.

17. A method of claim 15, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

18. A method of claim 15, wherein the polymerization is an emulsion polymerization.

19. A method of preparing a water-based latex comprising the steps of:

contacting a solvent-borne alkyd or uralkyd with at least one latent oxidatively-functional monomer to form a monomer/alkyd mixture wherein said solvent-borne alkyd or uralkyd is soluble in said latent oxidatively-functional monomer;

dispersing said monomer/alkyd mixture in an aqueous medium to form a pre-emulsion;

shearing said pre-emulsion to form a mini-emulsion; and polymerizing said mini-emulsion.

20. A method of claim 19, wherein said aqueous medium comprises water and a surfactant.

21. A method of claim 19, wherein said mini-emulsion comprises droplets ranging in size from about 50 to about 500 nm.

22. A method of claim 19, wherein said latent oxidatively-functional group is selected from the group consisting of allyl, vinyl, acetoacetyl, and enamine.

23. A method of claim 19, wherein said latent oxidatively-functional monomer is selected from the group consisting of allyl methacrylate, vinyl methacrylate, acetoacetoxyethyl methacrylate, hydroxybutenyl methacrylate, an allyl ester of maleic acid, a diallyl ester of maleic acid, and poly(allyl glycidyl ether).

24. A method of claim 15, wherein said sheared mini-emulsion further comprises at least one ethylenically unsaturated co-monomer.

25. A method of claim 19, wherein said monomer/alkyd mixture further comprises at least one ethylenically unsaturated co-monomer.

* * * * *